United States Patent [19]

Brister

[11] Patent Number: 4,509,343
[45] Date of Patent: Apr. 9, 1985

[54] APPARATUS FOR INSERTING A FLEXIBLE BAG INTO A FLUID TRANSMISSION LINE

[76] Inventor: Beryle D. Brister, P.O. Box 9272, Amarillo, Tex. 79105

[21] Appl. No.: 573,554

[22] Filed: Jan. 25, 1984

Related U.S. Application Data

[63] Continuation-in-part of Ser. No. 328,029, Dec. 8, 1981, Pat. No. 4,428,204.

[51] Int. Cl.³ .............................................. F25B 19/00
[52] U.S. Cl. .................................. 62/514 R; 137/317; 138/93
[58] Field of Search ....................... 138/93, 94; 137/15, 137/317, 318; 62/514 R, 66

[56] References Cited

U.S. PATENT DOCUMENTS

| | | | |
|---|---|---|---|
| 3,164,964 | 1/1965 | Josephson | 138/93 |
| 3,310,615 | 3/1967 | Bender | 264/45 |
| 3,665,966 | 5/1972 | Ver Nooy | 138/93 |
| 3,774,646 | 11/1973 | Smith | 138/94 |
| 3,842,864 | 10/1974 | Riegel et al. | 138/93 |
| 3,926,006 | 12/1975 | Brooks et al. | 62/66 |
| 4,112,706 | 9/1978 | Brister | 62/514 |
| 4,291,727 | 9/1981 | Yie et al. | 138/93 |

OTHER PUBLICATIONS

Iris-Stop Flow Stopping Equipment—ALH Systems Limited—England.

Primary Examiner—Ronald C. Capossela
Attorney, Agent, or Firm—Hubbard, Thurman, Turner & Tucker

[57] ABSTRACT

Apparatus for inserting a flexible bag into the interior of a fluid transmission line to form a plug by filling the bag with a freezable liquid. The apparatus comprises a cylindrical frame member with a flange for mounting the apparatus on a saddle member attached to the transmission line. A first telescoping tubular member is mounted on the frame member and supports second and third telescoping tubular members and provides a cavity for storing the bag in a collapsed condition. The second tubular member is connected to the bag and is operable to eject the bag from the first tubular member into the transmission line interior. The third tubular member is operable to extend into the bag interior, includes a liquid conduit for filling the bag and includes conduits for circulating cooling or heating fluid within the interior of the third tubular member to form a heat exchanger for accelerating the freezing or thawing of the liquid within the bag. An embodiment adapted for high pressure transmission line applications includes a power screw actuator having a guide sleeve for storing the bag and for inserting the bag into the transmission line interior. Coaxial bag injection members and liquid conduit members are arranged one within the other for ejecting the bag from the guide sleeve to the transmission line interior and providing a flow path for liquid to fill the bag.

19 Claims, 7 Drawing Figures

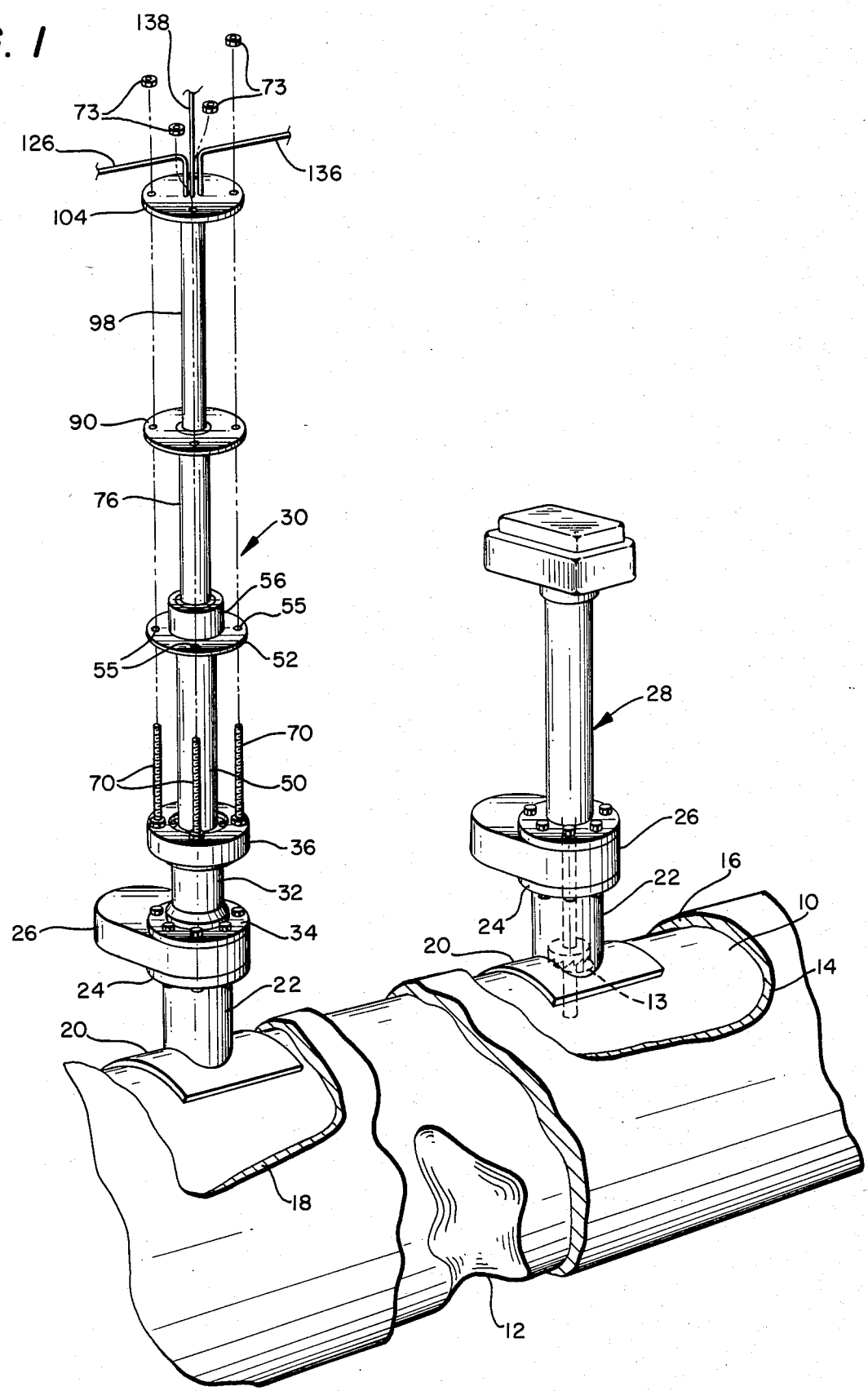

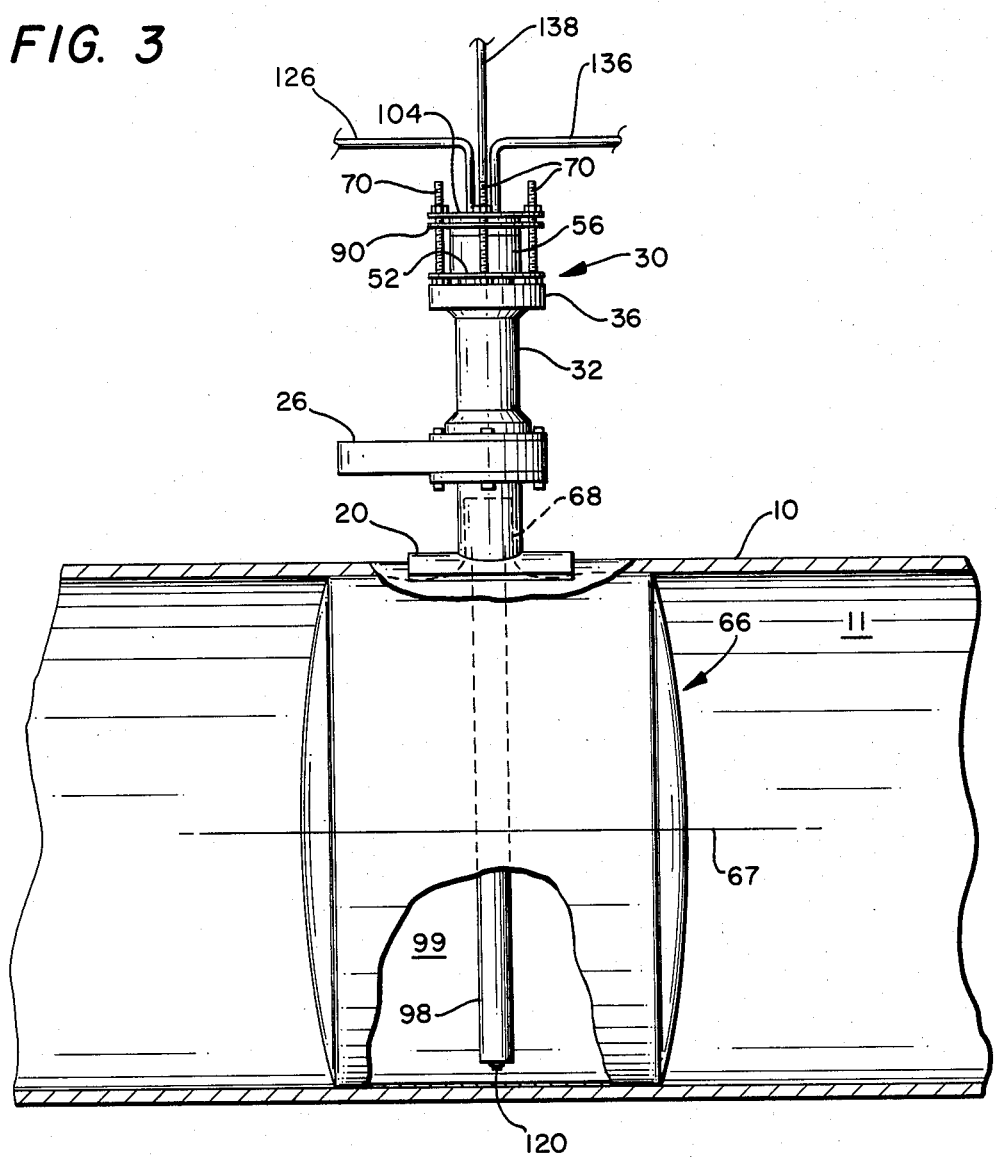

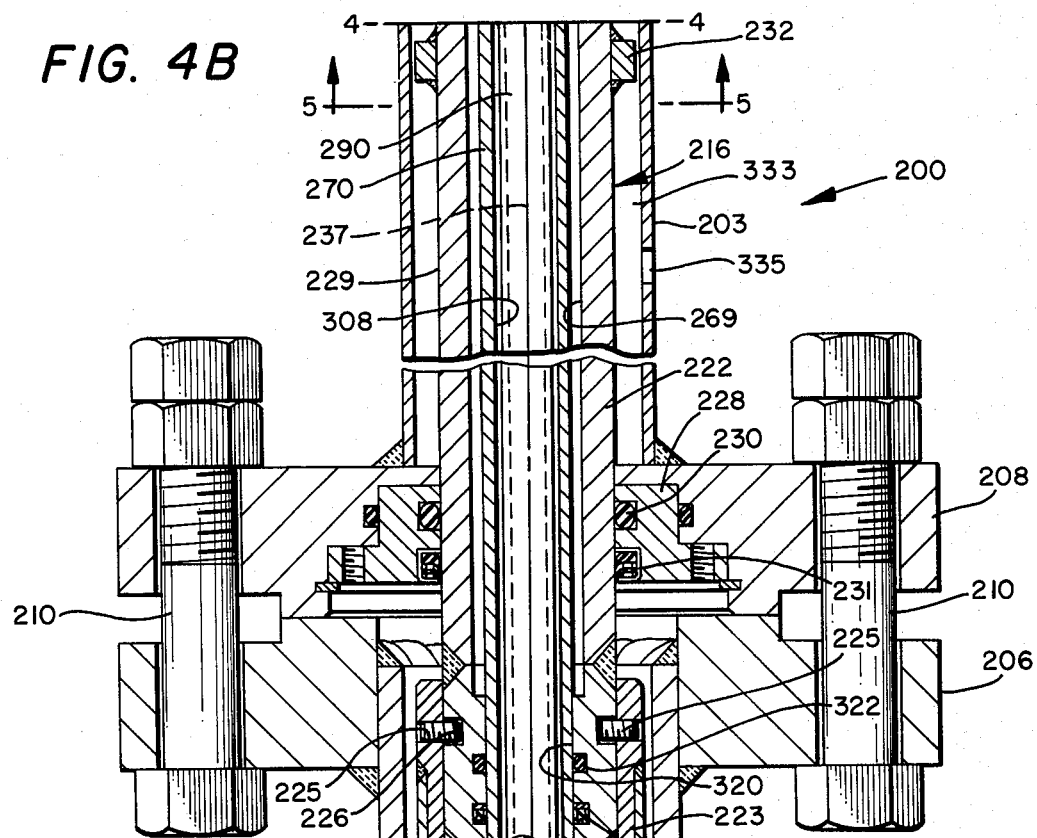
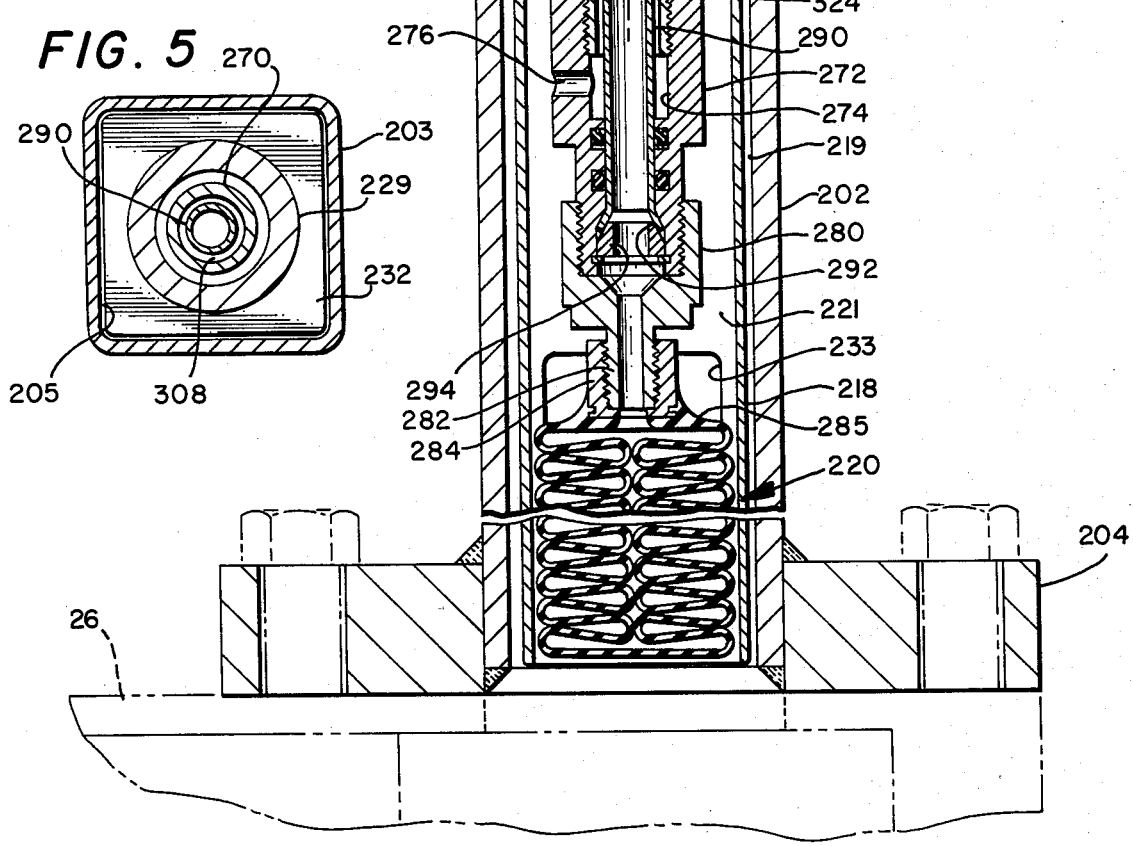
FIG. 4B
FIG. 5

APPARATUS FOR INSERTING A FLEXIBLE BAG INTO A FLUID TRANSMISSION LINE

CROSS-REFERENCE TO RELATED APPLICATION

This application is a continuation-in-part of U.S. patent application Ser. No. 328,029, filed: Dec. 8, 1981, now U.S. Pat. No. 4,428,204.

BACKGROUND OF THE INVENTION

1. Field of the Invention

The present invention pertains to an apparatus adapted to mount on a fluid transmission line for inserting a flexible bag into the line interior wherein the bag is filled with liquid and frozen to form a flow stopping plug. One embodiment of the apparatus includes an elongated tubular probe member comprising a heat exchanger for freezing and thawing the liquid within the bag interior.

Background

The above-referenced patent pertains to a method and apparatus for repairing fluid transmission lines and the like by inserting a flexible bag into the interior of the line, filling the bag with liquid and freezing the liquid to form a substantially fluid-tight plug in the line adjacent to a point wherein the line requires repair or replacement of a line section for various purposes.

In the development of the invention described in the above-referenced patent, it has been determined that it is desirable to be able to accelerate the liquid freezing and thawing process during the procedure for repairing or replacing the line by exchanging heat with the liquid in the bag as rapidly as possible. Since the bag is disposed within the interior of the transmission line the provision of a cryogenic fluid circulation chamber on the exterior surface of the line requires some time to freeze the liquid in the bag. Moreover, in certain environments such as submarine pipelines, the deployment of the cryogenic fluid circulation casing for encircling the pipeline to form the freeze plug is a difficult exercise and if fluid can be frozen and thawed in the bag from a heat exchanger deployed within the bag several advantageous are realized. In any event, it is desirable to be able to bring about the freezing and thawing of the liquid within the bag as well as to provide for easy insertion of and removal of the bag from the line interior. To this end there has been a need for certain improvements in apparatus for inserting flexible bags into the interior of various types of fluid transmission lines. Foremost among these needs, is perhaps the need to provide a greater rate of heat exchange between the liquid in the bag and the fluid being used to cool or heat the liquid as mentioned above. In other regards there has been a need for apparatus which is easy to operate in the process of inserting the bag into the line interior, inserting and removing a heat exchanger with respect to the interior of the bag, and removing the bag from the line interior when the operation requiring the flow stopping plug has been completed.

There has also been a need for an improved apparatus for inserting and withdrawing flexible bags with respect to the interior of a fluid transmission line, wherein the apparatus is adapted for conditions wherein relatively high fluid pressures exist within the line interior both during the bag insertion process and thereafter while the apparatus is mounted on the transmission line and connected to the bag.

The present invention provides for a flexible bag insertion apparatus for forming a flow stopping plug in a fluid transmission line or the like which provides certain unique features and solves several problems present in the art.

SUMMARY OF THE INVENTION

The present invention provides an improved apparatus for inserting a flexible bag into the interior of a fluid transmission pipeline or the like wherein the bag is filled with fluid to form a flow stopping plug within the line interior.

In accordance with one aspect of the present invention there is provided an apparatus for inserting a flexible bag into the interior of a fluid transmission line, filling the bag with a freezable liquid, and providing means for exchanging heat with the liquid within the bag to freeze or thaw the liquid in the formation of or disposal of a substantially fluid-tight or flow stopping plug within the interior of the transmission line.

In accordance with another aspect of the present invention there is provided a bag insertion apparatus comprising a plurality of telescoping tubular members forming a casing for containing a collapsed flexible bag, and a member connected to one end of the bag for injecting the bag into the transmission line interior and maintaining the bag secured to the injection apparatus, the telescoping members being supported on a generally cylindrical frame which may be mounted on the exterior of the transmission line on a suitable flange member. The bag insertion apparatus includes a unique structure wherein the telescoping members are adapted to be secured to the frame to prevent unwanted extension of the members relative to each other.

In accordance with still a further aspect of the invention the apparatus includes a third telescoping member in the form of a generally cylindrical tube enclosing a liquid conduit for filling the bag with a freezable liquid and also forming a heat exchanger for circulating a cooling or heating fluid within the heat exchanger to freeze or thaw the liquid within the bag. The third telescoping member is insertable into the interior of the bag once the bag has been deployed into the interior of the transmission line to provide a heat exchanger for direct contact with the liquid in the interior of the bag whereby the process of freezing or thawing the liquid may be accelerated as compared with reliance on heat exchangers disposed on the exterior of the transmission line in the vicinity of the bag.

In accordance with still a further aspect of the present invention one embodiment thereof provides improved apparatus for use in conjunction with relatively high pressure transmission lines for injecting a flexible bag into the line interior and for measuring the fluid pressure within the interior of the line on one side of the plug formed by the bag. The high pressure bag injection apparatus is particularly adapted to withstand high pressures within the transmission line interior without leaking line fluid through the apparatus and without ejecting the bag and its support tube. The apparatus is also provided with a screw actuator mechanism for extending a member telescopically within an outer casing for holding the bag whereby the inner member may be operated to insert and withdraw the bag with respect to the transmission line interior.

The above-noted aspects of the present invention as well as additional superior features thereof will be further appreciated by those skilled in the art upon reading the detailed description which follows in conjunction with the drawing.

BRIEF DESCRIPTION OF THE DRAWING

FIG. 1 is a perspective view of a section of a fluid transmission line being prepared for and having mounted thereon at respective points an apparatus in accordance with the present invention;

FIG. 3 is a detail view of the apparatus of FIGS. 2A and 2B with its bag in the deployed position within a transmission line;

FIGS. 4A and 4B comprise a longitudinal central section view of an alternate embodiment of a bag insertion apparatus in accordance with the present invention; and FIG. 5 is a section view taken along line 5—5 of FIG. 4B.

DESCRIPTION OF THE PREFERRED EMBODIMENTS

Figure 2A:
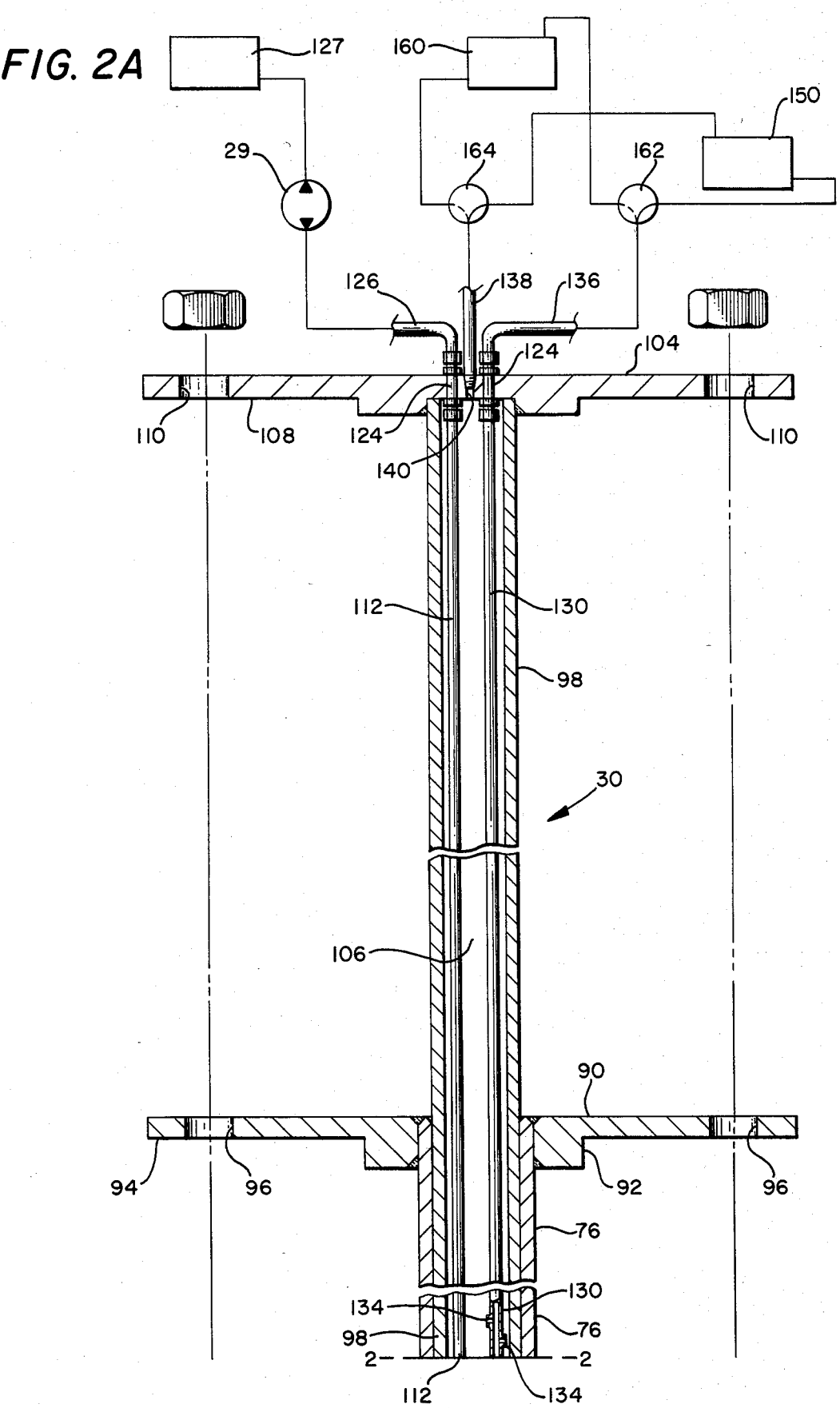
FIGS. 2A and 2B comprise a longitudinal central section view of one embodiment of a bag insertion apparatus in accordance with the present invention.

In the description which follows like parts are marked throughout the specification and drawing with the same reference numerals, respectively. The drawing is not necessarily to scale and certain views may show the features of the invention exaggerated in scale or in schematic form in the interest of clarity and conciseness.

Referring to FIG. 1, there is illustrated a section of a fluid transmission line, generally designated by the numeral 10 which has been damaged at 12 and is in need of repair by removing a section of the line including the damaged portion 12. The transmission line 10 may, for example, be a petroleum products pipeline, a gas transmission line or virtually any fluid carrying conduit. However, for the sake of description herein the transmission line 10 will be considered to be a relatively large diameter cylindrical pipeline for transmitting any number of various types of fluids.

In a submarine environment, for example, the transmission line 10 is typically provided with a protective cover 14 which has been removed at 16 and 18, as indicated, to expose the surface of the cylindrical transmission line itself. The transmission line 10 is typically prepared for the formation of a fluid flow stopping plug by mounting a saddle member 20 on the line 10 and suitably securing the saddle member to the line. The saddle member 20 is provided with a generally cylindrical pipe section 22 and a flange 24. A suitable gate or wafer valve 26 is mounted on the flange 24 whereby the pipe section 22 may be opened and closed so that, upon forming a hole in the sidewall of the transmission line 10, the flow of fluid into and out of the interior of the line may be controlled.

As shown in FIG. 1, apparatus comprising a tapping machine 28 is mounted on the valve 26 and is operable to form a hole 13 in the side of the transmission line 10 in a manner well known. Further description of the hole forming process is not believed to be necessary to understand the present invention. However, FIG. 1 also illustrates a second saddle member 20 supporting a valve 26 thereon and on which there is supported apparatus 30 in accordance with the present invention for inserting a flexible bag into the interior of the transmission line. Typically, after formation of a hole of suitable diameter in the sidewall of the transmission line 10 the apparatus 28 is removed from the valve 26 and a bag insertion apparatus 30 is mounted on the valve. The valve 26 is, of course, closed prior to demounting of the apparatus 28 with respect to the valve and reopened after mounting of the apparatus 30 thereon and prior to insertion of the bag. In this way flow of fluid into and out of the transmission line 10 is avoided during the process of preparing the line for the formation of a flow stopping plug within the line interior.

Figure 2B:
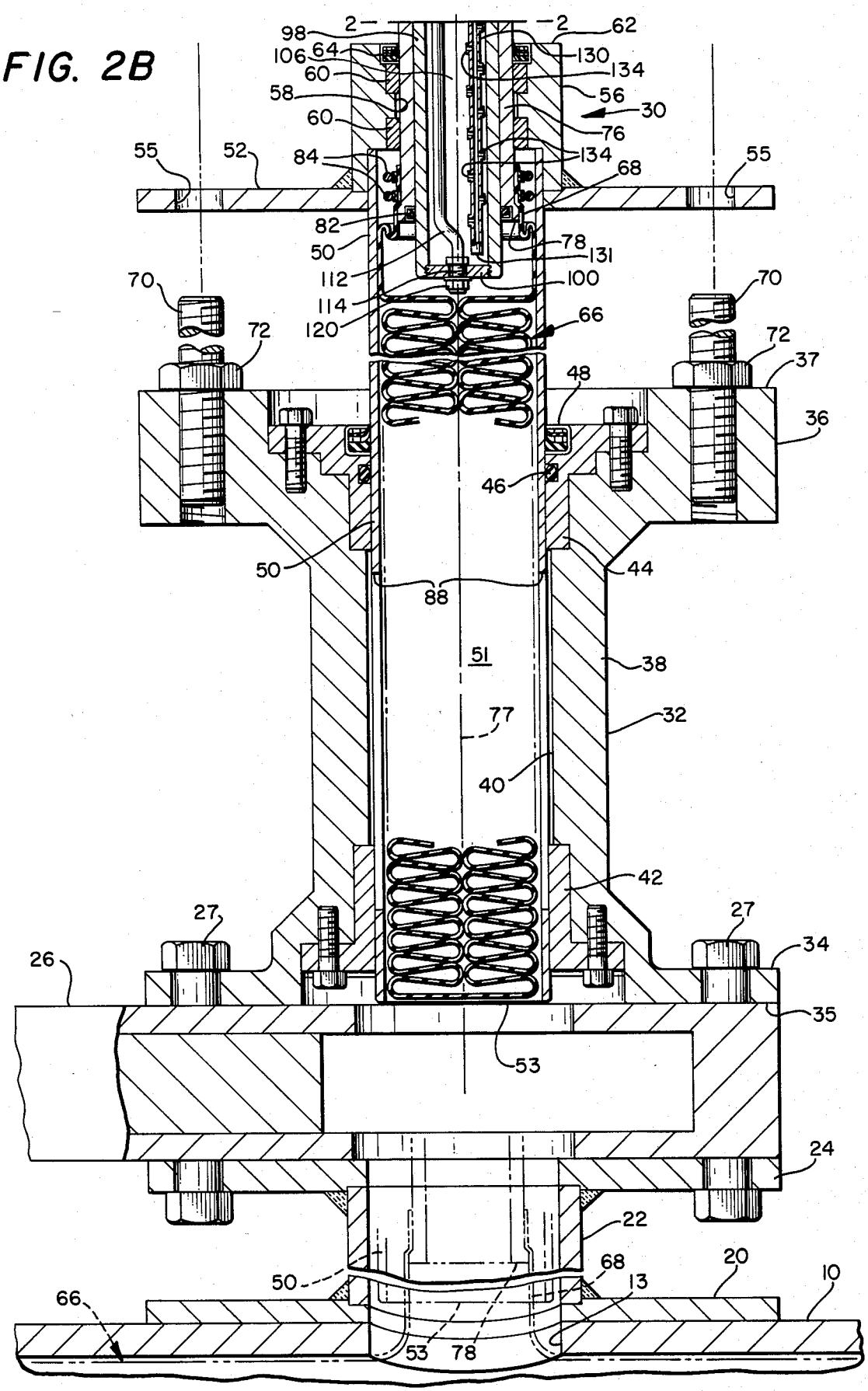

Referring to FIGS. 1, 2A and 2B, the bag insertion apparatus 30 will be described in detail. FIGS. 2A and 2B are intended to be viewed together and whereby one figure is a continuation of the other from the lines 2—2. The bag insertion apparatus 30 comprises a frame member characterized as a generally cylindrical member 32 having opposed cylindrical flanges 34 and 36 interconnected by a tubular sleeve portion 38 having a bore forming an interior wall 40. The flanges 34 and 36 are provided with opposed transverse faces 35 and 37, respectively. The flange 34 is adapted to be secured to the casing of the valve 26 by conventional fasteners 27. The flanges 34 and 36 are each counterbored to receive a cylindrical bearing insert 42 and a bearing insert 44, respectively. The bearing insert 44 is also provided with a circumferential groove for an o-ring seal 46 and a second circumferential groove for receiving a secondary seal assembly 48. The seal 48 may, for example, be a resilient annular lip seal or similar suitable sealing structure.

As shown in FIG. 2B, the bearing inserts 42 and 44 are operable to slidably journal an elongated cylindrical tube member 50 which extends through the casing 38 and is provided at its upper end with a cylindrical flange member 52. The flange member 52 includes a cylindrical hub portion 56 having an inner cylindrical bore wall 58 and which is counterbored at opposite ends to receive bearing inserts 60. An upper transverse surface 62 of the hub 56 is counterbored to receive a cylindrical annular sealing structure 64 also comprising a resilient annular lip seal assembly. The tube 50 is slidably disposed in the frame casing 32 and is operable to form a casing for storing within its interior 51 a collapsible flexible bag, generally designated by the numeral 66, and shown in a collapsed and folded condition within the tube 50 in FIG. 2B. The bag 66 is preferably formed of a suitable liquid impervious fabric or monosheet material and is provided with an integral reduced diameter neck portion 68. The bag 66 is of generally cylindrical configuration with respect to an axis 67, when unfolded in the deployed position as shown in FIG. 3, and is preferably of slightly larger diameter than the interior of the transmission line 10 when fully inflated or filled with a liquid under pressure. The folded configuration of the bag 66 as shown in FIG. 2B is exemplary and the actual form of the folds may vary with bag size and material.

Referring further to FIG. 2B, the flange 52 is provided with a circular pattern of clearance holes 55 whereby the flange may be disposed over a plurality of vertically extending threaded stud members 70 extending from and secured to the flange 36. The studs 70 are threadedly engaged with the flange 36 and may be locked thereto by suitable locknuts 72, as shown. The flange 52 comprises support means for a second elongated tube, generally designated by the numeral 76. The tube 76 extends through the hub portion 56 of the flange member 52, into the interior of tube 50 and is secured at its lower end 78 to the bag neck 68. The end 78 of tube member 76 is preferably formed with a shoulder and is counterbored to receive a generally cylindrical annular seal structure 82 comprising a resilient lip seal assembly. The bag neck 68 is suitably retained on the lower end of the tube 76 by means such as conventional band clamps 84. The outer tube 50 is provided with suitable opposed slotlike openings 88 to provide access to the band clamps 84 for installing the bag 66 on the end of tube 76 and to assist in folding the bag and inserting the bag within the interior 51 of tube 50 in the collapsed or folded condition of the bag, as indicated by the solid lines in FIG. 2B.

Referring to FIGS. 1 and 2A, the upper end of the tube 76 is secured to a cylindrical flange member 90 including a hub portion 92 and a circumferential annular flange portion 94. The flange portion 94 is provided with a plurality of clearance holes 96 having a spacing pattern corresponding to the bolt circle pattern of the studs 70. The tube 76 is adapted to journal a third cylindrical tube, generally designated by the numeral 98, which is of sufficient length to extend entirely through the tube members 50 and 76 and is of sufficient length to extend substantially diametrally across the exterior chamber 99 of the bag 66 when the bag is deployed in the position shown in FIG. 3, for example.

The tube 98 includes a lower transverse closure plug member 100, FIG. 2B, which is removably secured to the lower end of the tube member 98 by cooperating sealable threads, and the upper end of the tube member 98 is closed by a cylindrical flange member 104, FIG. 2A, to form an elongated interior chamber 106. The flange member 104 includes a circular flange portion 108 having a plurality of spaced apart clearance holes 110 arranged on the same bolt circle pattern as the clearance holes 96, the clearance holes 55 and the studs 70. The tube member 98 is also adapted to support an elongated conduit 112 which extends from the flange member 104, through the chamber 106 toward the closure plug 100. The conduit 112 is suitably secured to a bulkhead type tube fitting 114 which extends through a suitable clearance hole in the plug 100 and is preferably aligned with the central longitudinal axis 77 of the tube member 98. The bulkhead fitting 114 is secured to the plug member 100 by a removable nut 120. The upper end of the conduit 112 is also secured to a bulkhead fitting 124 and to further conduit means 126 in communication with a source 127 of a freezable liquid, such as water, or the like for filling the bag interior chamber 99.

The apparatus 10 includes means for circulating a fluid within the chamber 106 to exchange heat with liquid within the bag 66 in a manner to be described further herein. As shown in FIGS. 2A and 2B, an elongated conduit 130 extends from the flange member 104 downward substantially through the entire length of the chamber 106 and is closed at its bottom end 131. The conduit 130 is provided with a plurality of nozzles 134 which are arranged spaced apart radially and longitudinally along conduit 130 to direct a flow of cryogenic fluid into the interior chamber 106 and against the wall of tube 98 to exchange heat through the tube 98 with liquid within the bag interior 99 when the bag 66 has been deployed into the position shown in FIG. 3 and the tube member 98 has been lowered into the position in the bag shown in FIG. 3, also. The conduit 130 is also connected at its upper end to a bulkhead fitting 124 extending through the flange member 104 and connected to a conduit 136 which is in communication with a source of heat transfer fluid. The interior chamber 106 is also in communication with a conduit 138 supported on the flange member 104 and opening into the chamber 106 through a passage 140. Depending on the fluid being injected into the chamber 106, the conduit 138 may be open to atmosphere or may conduct fluid being injected into the chamber 106 back to the fluid source. The apparatus 30 may be suitably connected to the system for circulating cryogenic fluids or other heat exchange fluids through the chamber 99 in accordance with the system described in U.S. Pat. No. 4,428,204.

Referring now to FIG. 3, the bag insertion apparatus 30 is shown in the deployed position of the bag 66 within the interior 11 of transmission line 10, for example. Prior to insertion of a bag into the transmission line interior as previously described, the apparatus 30 is mounted on the valve 26 with the tube 98 fully extended upwardly to its limit position as shown in FIG. 1. In like manner, the tube member 98 is preferably fully extended upwardly with respect to the tube member 50 and the member 50 is fully extended upwardly so that there is no protrusion below the plane of the flange surface 35, viewing FIG. 2B. The bag 66 is disposed in its collapsed and folded condition within the interior chamber 51 of tube 50 and the sources of liquid and heat exchange fluid connected to the respective conduits 112 and 130 are shut off from flow communication with these conduits. The bag insertion apparatus 30 is particularly adapted for use in conjunction with low pressure transmission line plugging applications wherein pressure has been relieved from the line interior.

Upon opening of the valve 26 the entire assembly of the tubes 50, 76 and 98 are moved downwardly relative to the frame casing 32 and along the common longitudinal central axis 77 of members 50, 76 and 98 until the bottom edge 53 of the tube member 50 is substantially flush with or slightly above the the interior wall surface of the transmission line 10, as indicated by the alternate position lines in FIG. 2B. Suitable indicia may be marked on the exterior surface of the tube 50 or the length of the tube 50 relative to the overall axial dimension of the valve 26 and the saddle member 20 may be predetermined so that when the flange member 52 is moved downwardly such that the flange 54 rests on the nuts 72 the distal end 53 will be in the position described above relative to the interior wall surface of the transmission line 10. After the tube member 50 is positioned it may be secured by threading locknuts, not shown, over the studs 70 to secure the flange 54 against the nuts 72 in assembly with the frame casing 32.

The tube member 76 is then moved downward relative to the tube member 50 to push the bag 66 out of the tube member 50 and into the interior of the transmission line 10. The overall length of the tube member 76 is predetermined to be such that when the flange member 90 moves down to engagement with the surface 62 of the flange 52 the tube end 78 will be in the position shown by the alternate position lines in FIG. 2B and all but the neck 68 of the bag 66 will be ejected from the interior of the tube member 50. The bag 66 will now be in its deployed position within the interior of the transmission line 10. The tube member 98 is then lowered into the bag interior chamber 99 to the position indicated in FIG. 3, which corresponds to a position wherein the flange 104 engages the flange member 90 and studs 70 then extend through the clearance holes 110. At this time suitable nuts 73, FIG. 1, may be threaded over the distal ends of the studs 70 to lock the flanges 104, 90, and 52 in assembly with the frame casing 32.

When the tube member 98 is fully extended into the bag interior chamber 99 the bag may be filled with liquid by conducting suitable freezable liquid such as water through conduits 126 and 112 into the chamber 99 until it is filled and the bag is expanded into engagement with the inner wall surface of the transmission line 10. The bag filling process may commence before the tube 98 is inserted to the position shown in FIG. 3. Although the bag 66, in its collapsed condition as shown in FIG. 2B, has virtually no interior volume, any air trapped in the bag interior during the liquid filling process may leak past the seal assembly 82 and between the surfaces of the tubes 76 and 98. A pressure gauge, not shown, may be placed in communication with the conduit 126 to indicate when the bag 66 is substantially full of water.

With the bag 66 deployed in the position illustrated in FIG. 3 and filled with liquid and with the heat exchanger tube or probe member 98 extended into the bag, fluid may be circulated through the conduit 136 and conduit 130 into the chamber 106 for heat exchange with the liquid in the bag chamber 99 through the wall of the tube 98. For example, in conjunction with the teaching of my aforementioned patent, a cryogenic fluid such as liquid nitrogen may be injected through the nozzles 134 into the chamber 106 whereby the circulation of the liquid nitrogen and evaporation thereof may be used to extract heat from the liquid in the interior of the bag 66 to rapidly freeze the liquid to expand and form a substantially fluid-tight flow stopping plug within the transmission line 10. As shown by the schematic diagram in FIG. 2A the conduits 136 and 138 may be selectively placed in communication with a source 150 of cooling fluid and a source 160 of heated fluid by way of respective selector valves 162 and 164 whereby the bag freezing and thawing process may be carried out. The freezing process may be accelerated by the placement of an annular structure, not shown, on the exterior of the line 10 for circulation of liquid in accordance with the teachings of U.S. Pat. No. 4,220,012.

When it is desired to remove the plug formed by the bag 66, the conduit 136 may be placed in communication with the source of heated fluid 160, such as steam, for circulation through the chamber 106 wherein the ice plug formed within the bag 66 may be melted more rapidly than provided for with prior art techniques. After the liquid within the chamber 99 is melted, it may be pumped out by placing the conduit 112 in communication with a reversible pump 29, FIG. 2A, for removing water from the bag and whereupon the bag may then be withdrawn by extending the tubes 98 and 76 relative to the tube 50. In fact, if no fluid is present in the transmission line 10, the bag 66 may be extracted entirely through the valve 26 by removing the assembly of the tubes 50, 76, and 98 entirely from the frame casing 32, if necessary. If fluid pressure exists within the line interior 11 the bag 66 may be forcibly collapsed into the chamber 51 as the tubes 98 and 76 are extended back to the position shown in FIG. 1. Accordingly, a unique flexible bag insertion and filling apparatus has been provided in accordance with the embodiment of the invention illustrated in FIGS. 1, 2A, 2B and 3. As mentioned previously, the bag 66 may be made of a suitable durable fabric material such as canvas which has been impregnated or lined in its interior with a liquid impervious material without reducing its flexibility. The materials used for the injection apparatus 30 may comprise conventional engineering metals such as cast iron for the frame casing 32 and the tube flanges 52, 90 and 104. The tube members 50, 76 and 98 may be formed to be close fitting slidably disposed members, relative to each other, of suitable compatible bearing metals such as brass. The bearing inserts 42, 44 and 60 may be formed of a self lubricating material such as reinforced fluoropolymer plastics or the like.

Figure 4A:
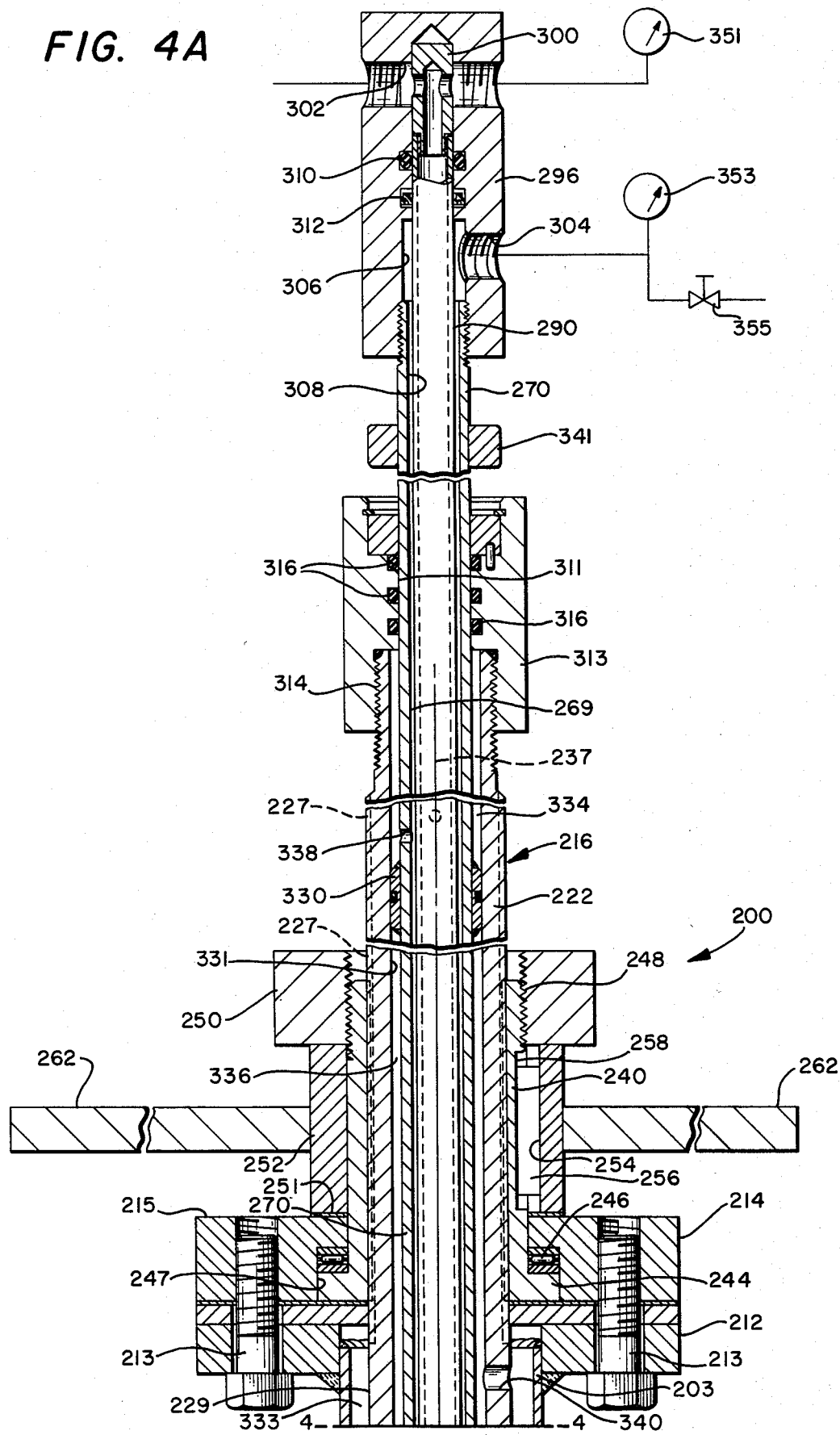

Referring now to FIGS. 4A and 4B, another embodiment of a flexible bag insertion apparatus is illustrated and generally designated by the numeral 200. FIGS. 4A and 4B are intended to be viewed together and one figure is a continuation of the other from the line 4—4. The bag insertion apparatus 200 includes a casing or frame comprising a generally cylindrical tube part 202 and a rectangular tube part 203, FIG. 4B. A lower cylindrical mounting flange 204 is secured to the casing part 202 and opposed intermediate flanges 206 and 208 are secured to the casing parts 202 and 203, respectively, and are adapted to be joined together by suitable threaded bolt and nut assemblies 210 for securing the casing parts 202 and 203 in assembly. The casing part 203 includes an upper cylindrical transverse flange member 212 secured by fasteners 213 to a cooperating flange 214 of an actuator, generally designated by the numeral 216.

The apparatus 200 includes an elongated cylindrical tubular bag guide sleeve or casing 218 which is adapted to be retracted to the position shown in FIG. 4B into a chamber 219 formed in the casing part 202. The guide sleeve 218 is open at its lower end, viewing FIG. 4B, and is operable to contain a flexible, fluid impervious and collapsible bag, generally designated by the numeral 220, in a folded and collapsed condition within a chamber 221 in the guide sleeve. The guide sleeve 218 is provided at its upper end with a hub part 223 which is mounted in sleeved relationship over the lower end of an elongated screw actuator member 222 having a circumferential external power screw thread portion 227. A pair of opposed set screws 225 are threadedly engaged with the hub part 223 and project into a circumferential groove 226 formed in the lower end of the screw actuator 222.

The guide sleeve 218 may be selectively rotatably positioned relative to the screw actuator 222 and have a longitudinal slot 233 formed therein whereby the bag 220 may be forced to be displaced from a side of the guide sleeve into the interior of the transmission line in a predetermined direction, if desired.

The lower portion 229 of the screw actuator 222 is formed as a generally smooth walled cylindrical tube which extends upward through the casing part 203 and is engaged with a seal assembly disposed in a suitable cavity in the flange 208 and comprising a seal mounting part 228 having an o-ring seal 230 and a resilient annular lip seal 231 mounted thereon and engaged with the lower tubular portion 229.

Referring to FIG. 5 also, the screw actuator 222 includes a square cross-section key member 232 mounted thereon and secured to the lower tubular portion 229. The key member 232 is slidably disposed in a guideway 205 formed by the casing part 203 for movement between the flanges 208 and 212. The key member 232 is operable to permit axial translation of the screw actuator 222 but to prevent rotation thereof about longitudinal axis 237. The external power screw thread portion 227 is cooperable with a nut 240. The nut 240 includes suitable internal threads cooperable with the screw actuator threaded portion 227 for axially translating the screw actuator 222 in response to rotation of the nut 240. The nut 240 also includes a lower transverse flange 244 which is engageable with a roller or needle type thrust bearing assembly 246 mounted in a stepped bore 247 of the flange 214. The upper end of the nut 240 is provided with external threads 248 which are cooperable with corresponding threads on a nut 250.

An axially extending hub part 252 is disposed in sleeved relationship over the nut 240 between the nut 250 and a bearing washer 251 supported on face 215 of the flange 214. The hub part 252 is formed to have an axially extending keyway 254 for receiving a square cross-section key 256. The key 256 is also disposed in a cooperating keyway 258 formed in the nut 240. The actuator 216 is preferably provided with laterally extending operating handles 262 secured to the hub part 252 for rotating the nut 240 whereby the screw actuator 222 may be translated axially in opposite directions depending on the direction of rotation of the handles 262.

The screw actuator 222 also has an interior bore 269 in which is slidably disposed an elongated tubular bag injection member 270. The bag injection member 270 includes a lower cap 272 which is threadedly engaged to the lower distal end of the bag injection member 270 and includes a stepped bore 274 and a transverse passage 276 opening into the chambers 219 and 221. The lower end of the cap 272 is secured to a reducer member 280 having a threaded spigot 282 which is threadedly engaged with a fitting 284 secured to neck 285 of bag 220. Accordingly, the bag 220 is releasably connected to the injection member 270 for insertion into and removal from the interior of a transmission line such as the transmission line 10.

The cap 272 is adapted to support one end of an elongated tubular conduit 290 comprising a flared tube which is secured in a conical bore 292 formed in the cap and retained therein by a flare adaptor member 294. The conduit 290 extends upward through the interior of the bag injection member 270 to a member 296 supported on and threadedly engaged with the upper end of the bag injection member. The upper end of the conduit 290 is provided with a suitable cross drilled fitting 300 which is in communication with a transverse bore 302 in the member 296. The member 296 also includes a port 304 opening into a bore 306 providing passage means in communication with an annular passage 308 formed by the bore 269 of the bag injection member 270 and the conduit 290. Suitable seals 310 and 312 are provided between the conduit 290 and the member 296 to prevent fluid communication between the passage 306 and the interior of the tube 290. Accordingly, the port 304 may be in communication with the chamber 219 and the interior of a transmission line by way of the port 276, the annular flow passage 308 and the passage 306 in member 296.

The bag injection member 270 is slidably within the screw actuator 222 in close fitting relationship within a bore 311 formed in an upper cap member 313 which is threadedly coupled to the upper end of the screw actuator 222 at 314. The cap 313 includes a plurality of axially spaced apart o-ring seals 316 disposed in suitable grooves opening to the bore 311. The injection member 270 is also supported for linear translation at the lower end of the screw actuator 222 in close fitting relationship with a bore 320 formed in the actuator and provided with suitable fluid seals 322 and 324 operable to be in fluid sealing engagement with the cylindrical exterior surface of the injection member 270.

The injection member 270 is further provided with a piston 330, FIG. 4A, secured to the injection member and slidably disposed in a bore 331 and dividing the bore into opposed annular fluid chambers 334 and 336 formed between the bore 331 and the injection member 270. A port 338, formed in the wall of the injection member 270, opens into the chamber 334 from the annular passage 308, and a vent port 340 is formed in the screw actuator 222 and opens into the chamber 336 for venting same through a chamber 333 and a port 335 formed in casing part 203.

As previously mentioned, the apparatus 200 may be mounted on the valve 26 in place of the apparatus 30, or on a similar arrangement of a saddle and valve, by bolting the flange 204 to the bolt circle on the valve 26 using the fasteners 27 or the like. When the apparatus 200 is mounted on the valve 26 in preparation for injection of the bag 220 into the interior of the transmission line, the screw actuator 222 and the bag injection member 270 are in their retracted positions illustrated in FIGS. 4A and 4B and the bag 220 is disposed within the chamber 221. Upon opening of the valve 26 to permit access to the interior of the transmission line the screw actuator 222 is translated linearly downwardly, viewing FIGS. 4A and 4B, by rotation of the actuator nut 240 to axially translate the screw actuator 222 and the bag guide sleeve 218 into the interior of the transmission line. When the guide sleeve 218 has been inserted to a predetermined position into the transmission line, the bag injection member 270 is then translated or telescoped with respect to the actuator 222 into the interior of the transmission line to eject the bag from the chamber 221 into the line interior so that it may be filled with liquid through the conduit 290 and reducer fitting 280. This operation may be carried out manually by pushing down on the injection member 270 by grasping a stop collar 341, FIG. 4A, secured to the injection member.

The cap 296 is suitably connected to a source of pressure liquid such as water at the port 302 for filling the bag 220. A pressure gauge 351 may be connected to the port 302 to measure the pressure of the water injected into the bag interior. A pressure gauge 353 is preferably connected to the port 304 to measure the pressure in the chambers 219 and 221 which is typical also of the pressure in the transmission line on one side or the other of the bag in its deployed position.

Thanks to the provision of the closed fluid chamber 334 pressure fluid at the prevailing pressure in the chambers 219 and 221 and the transmission line may be imposed on the piston 330 to urge the bag injection member 270 downwardly into the interior of the transmission line to maintain the bag in its deployed position and to balance pressure fluid forces acting on the end cap 272. In this regard the axially projected annular area of the piston 330 exposed to fluid pressure in the chamber 334 offsets any resultant pressure force tending to urge the injection member 270 up into the chamber 221 to force the bag out of the transmission line.

Thanks also to the provision of slot 227 in the guide sleeve 218, if the guide sleeve is inserted diametrally across the interior of the transmission line the bag 220 may be forced from chamber 221 laterally through the slot 227 in a predetermined direction. If the guide sleeve 218 is inserted to a position wherein its lower end is flush with the sidewall of the line 10 adjacent the access hole 13 the bag 220 will be deployed from the guide sleeve lower end.

Upon insertion of the bag 220 into a deployed position, similar to that shown in U.S. Pat. No. 4,428,204, liquid may be injected into the bag through the conduit 290 and a flow stopping plug forming process carried out in accordance with the method described and claimed in the above-referenced patent.

When it is desired to remove the bag 220, using the apparatus 200, water is pumped out of the interior of the bag or forced out through conduit 290 by fluid pressure in the transmission line acting on and tending to collapse the bag. The bag injection member 270 is withdrawn up into the chamber 219 by relieving pressure in the passage 308 using a valve 355, for example, to thereby reduce pressure in the chamber 334. The actuator nut 240 is then also rotated in the opposite direction to effect linear translation of the screw actuator 222 upward, viewing FIGS. 4A and 4B, into the chamber 219 to the retracted position shown. Fluid pressure in the transmission line is normally sufficient to collapse the bag 220 back into the chamber 221.

The apparatus 200 may be also constructed using conventional engineering materials for the various structural parts and for the fluid seals.

Although preferred embodiments of the present invention have been described in detail herein those skilled in the art will recognize that various substitutions and modifications may be made to the invention without departing from the scope and spirit thereof as recited in the appended claims.

What I claim is:

1. Apparatus for inserting a flexible collapsible bag into a fluid transmission line and expanding said bag to form a flow stopping plug in said transmission line by filling said bag with a liquid and freezing said liquid in said bag, said apparatus comprising:
   a frame for supporting said apparatus on said transmission line adjacent an opening in the wall of said transmission line;
   a first member forming a casing for holding said bag in a collapsed condition;
   a second member and means for connecting said bag to said second member, said second member being movable relative to said first member for injecting said bag into the interior of said transmission line;
   means forming a passage for conducting liquid into the interior of said bag; and
   means forming a heat exchanger extending into the interior of said bag when said bag is filled with liquid for transferring heat from said liquid to cool said liquid to form a frozen plug within said bag.

2. The apparatus set forth in claim 1 wherein:
said means forming said heat exchanger comprises an elongated probe member insertable into said bag when said bag is expanded within said transmission line, and means for circulating fluid within said probe member in heat exchange relationship with liquid in said bag.

3. The apparatus set forth in claim 2 wherein:
said means forming said passage for conducting liquid into the interior of said bag comprises an elongated conduit extending through said probe member and opening to a lower end of said probe member when said probe member is in said bag.

4. The apparatus set forth in claim 2 wherein:
said means for circulating fluid in said probe member includes a conduit extending within said probe member and spaced apart nozzle means for injecting fluid into a chamber formed in the interior of said probe member, and means for venting said fluid from said chamber.

5. The apparatus set forth in claim 2 including:
a liquid conduit extending into said probe member and in communication with an interior chamber formed in said bag for conducting a freezable liquid into said bag.

6. The apparatus set forth in claim 1 wherein:
said frame includes a cylindrical sleeve portion including flange means for mounting said apparatus on said transmission line, and means for slidably supporting an elongated tube member comprising said casing projecting through said sleeve portion of said frame for extension toward said transmission line to position said bag for injection into said transmission line.

7. The apparatus set forth in claim 6 including:
a flange on one end of said casing and means for securing said flange to said frame when said casing has been extended toward said transmission line to position said bag.

8. The apparatus set forth in claim 7 wherein:
said second member includes an elongated bag injection tube telescopically supported in said tube member comprising said casing for telescoping movement relative to said casing, said injection tube including means at one end thereof for connecting said bag to said injection tube, and means for securing said injection tube to one of said casing and said frame when said injection tube has been extended into said casing to eject said bag substantially out of said casing and into the interior of said transmission line.

9. The apparatus set forth in claim 8 wherein:
said means forming said heat exchanger comprises an elongated tubular probe member supported in and telescopically movable relative to said injection tube, said probe member being insertable into said bag when said bag is ejected from said casing, and means on said probe member for securing said probe member against movement relative to said injection tube.

10. The apparatus st forth in claim 9 wherein:
said means for securing said probe member includes a flange disposed on the end of said probe member opposite the end insertable in said bag and operable to be secured to said frame.

11. The apparatus set forth in claim 9 wherein:
said frame includes at least two elongated threaded members projecting from a flange on said frame and parallel to the longitudinal axis of said casing, said injection tube and said probe member, and said probe member, said injection tube and said casing each including coaxial flanges operable to be stacked one on top of the other and secured to said frame by said threaded members to maintain said bag in the interior of said transmission line.

12. Apparatus for inserting a flexible bag into a fluid transmission line and expanding said bag to form a flow stopping plug in said transmission line by filling said bag with a liquid and freezing said liquid in said bag, said apparatus comprising:

a frame for supporting said apparatus on said transmission line adjacent an opening in the wall of said transmission line;

means forming a casing for holding said bag in a collapsed condition;

a member connected to said bag and being movable relative to said frame for injecting said bag into the interior of said transmission line;

means forming a passage for conducting liquid into the interior of said bag; and an elongated probe member insertable into said bag when said bag is expanded within said transmission line, and means for circulating fluid within said probe member in heat exchange relationship with the liquid in said bag.

13. Apparatus for injecting a flexible bag into the interior of a fluid transmission line whereby said bag may be filled with fluid and expanded into engagement with the wall of said transmission line to form a flow stopping plug, said apparatus including:

a frame including means for mounting said apparatus on said transmission line at a point wherein an opening is formed in said transmission line for insertion of said bag;

an elongated tubular guide member supported on said frame and movable relative to said frame, said guide member forming a chamber for containing said bag in a collapsed condition;

an actuator connected to one end of said guide member, said actuator comprising an elongated power screw member supported on said frame for axial but nonrotatable movement relative to said frame and engageable with a rotatable nut supported on said frame for moving said guide member toward and away from said transmission line;

an elongated tubular injection member supported by said actuator for telescoping movement relative to said actuator and said frame, said injection member being connected at one end to said bag and including means forming first passage means for conducting fluid into the interior of said bag; and means for moving said injection member relative to said actuator and said guide member for inserting said bag in and withdrawing said bag from said transmission line.

14. The apparatus set forth in claim 13 wherein:
said actuator includes key means slidably disposed in means forming a guideway on said frame and cooperable with said guideway to provide axial but nonrotatable movement of said actuator relative to said frame.

15. The apparatus set forth in claim 13 wherein:
said injection member includes second passage means extending therethrough and in communication with said chamber in said guide member and with means for measuring the fluid pressure in said transmission line.

16. The apparatus set forth in claim 15 wherein:
said first passage means is formed by an elongated tubular conduit extending through said injection member, and a fitting disposed at one end of said injection member for connecting said bag to said injection member and to be in communication with said first passage means; and said second passage means is formed in a bore of said injection member between said conduit and said injection member.

17. The apparatus set forth in claim 13 wherein:
said injection member is connected to piston means disposed in a bore formed in said actuator and dividing said bore into opposed chambers, one of said chambers being operable to be in communication with the interior of said transmission line whereby said injection member is urged toward a position wherein said bag is deployed in said transmission line.

18. The apparatus set forth in claim 13 wherein:
said nut is journalled for rotation on said frame, and said apparatus includes means engaged with said nut for rotating said nut to translate said actuator relative to said frame for injecting and withdrawing said bag relative to said transmission line.

19. Apparatus for injecting a flexible bag into the interior of a fluid transmission line whereby said bag may be filled with fluid and expanded into engagement with the wall of said transmission line to form a flow stopping plug, said apparatus including:

a frame including means for mounting said apparatus on said transmission line at a point wherein an opening is formed in said transmission line for insertion of said bag;

a guide member supported on said frame and movable relative to said frame, said guide member forming a chamber for containing said bag in a collapsed condition;

an actuator supported on said frame and operably connected to said guide member for moving said guide member toward and away from said transmission line;

an elongated tubular injection member supported by said actuator for telescoping movement relative to said actuator and said frame, said injection member being connected at one end to said bag and including means forming first passage means for conducting fluid into the interior of said bag; and piston means disposed in a bore formed in said actuator and forming with said bore a chamber operable to be in communication with the interior of said transmission line whereby pressure fluid acting on said piston means urges said injection member toward a position wherein said bag is deployed in said transmission line.

* * * * *